United States Patent
Schmidt et al.

(10) Patent No.: US 11,112,886 B2
(45) Date of Patent: Sep. 7, 2021

(54) MODEL AND DETACHABLE CONTROLLER FOR AUGMENTED REALITY / VIRTUAL REALITY EXPERIENCE

(71) Applicant: Disney Enterprises, Inc., Burbank, CA (US)

(72) Inventors: Craig J. Schmidt, San Jose, CA (US); Kyle W. Barrett, Redwood City, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/262,751

(22) Filed: Jan. 30, 2019

(65) Prior Publication Data

US 2020/0241655 A1 Jul. 30, 2020

(51) Int. Cl.
*G06F 3/0346* (2013.01)
*G06F 3/03* (2006.01)
(Continued)

(52) U.S. Cl.
CPC ....... *G06F 3/0346* (2013.01); *G02B 27/0176* (2013.01); *G06F 3/011* (2013.01); *G06F 3/016* (2013.01); *G06F 3/0304* (2013.01); *A63F 13/211* (2014.09); *A63F 13/213* (2014.09); *A63F 13/23* (2014.09);
(Continued)

(58) Field of Classification Search
CPC .... G06F 1/1613; G06F 1/1656; G06F 1/1684; G06F 1/1694; G06F 3/011; G06F 3/014; G06F 3/016; G06F 3/0304; G06F 3/0308; G06F 3/0325; G06F 3/033; G06F 3/0346; G06F 2203/013; A63F 13/12; A63F 13/21; A63F 13/211; A63F 13/213; A63F 13/23; A63F 13/24; A63F 13/245; A63F 13/285; A63F 13/428; A63F 13/843; A63F 13/92; A63F 13/98; A63F 2300/1037; A63F 2300/105; A63F 2300/1087; A63F 2300/1093; A63F 2300/8082; G02B 27/017; G02B 27/0172; G02B 27/0176

See application file for complete search history.

(56) References Cited

U.S. PATENT DOCUMENTS 6,597,342 B1 * 7/2003 Haruta ................ A63F 13/06
    345/157
9,457,281 B1 * 10/2016 Lam ..................... A63H 33/00
(Continued)

*Primary Examiner* — Keith L Crawley
(74) *Attorney, Agent, or Firm* — Patterson + Sheridan, LLP

(57) ABSTRACT

Embodiments include a method and associated system for providing an augmented reality experience. The method comprises receiving identification information from circuitry of a model removably attached to a controller device. A power source of the controller device provides power to the circuitry. The method further comprises receiving orientation information from one or more sensors of the controller device, and identifying, using a visual sensor, one or more external visual indicators of the model. The method further comprises maintaining a virtual model representing a model type indicated by the identification information. An orientation of the virtual model is based on the orientation information and referenced to the one or more external visual indicators, The method further comprises, responsive to receiving an input, displaying one or more visual effects referenced to the virtual model.

20 Claims, 11 Drawing Sheets

(51) Int. Cl.
*G06F 3/01* (2006.01)
*G02B 27/01* (2006.01)
*A63F 13/23* (2014.01)
*A63F 13/211* (2014.01)
*A63F 13/213* (2014.01)

(52) U.S. Cl.
CPC . *A63F 2300/105* (2013.01); *A63F 2300/1087* (2013.01); *A63F 2300/8082* (2013.01); *G02B 27/0172* (2013.01); *G06F 2203/013* (2013.01)

(56) References Cited

U.S. PATENT DOCUMENTS

| | | | |
|---|---|---|---|
| 2006/0252541 A1* | 11/2006 | Zalewski | A63F 13/02 |
| | | | 463/36 |
| 2006/0277571 A1* | 12/2006 | Marks | A63F 13/00 |
| | | | 725/37 |
| 2007/0265075 A1* | 11/2007 | Zalewski | A63F 13/06 |
| | | | 463/36 |
| 2009/0221374 A1* | 9/2009 | Yen | A63F 13/06 |
| | | | 463/42 |
| 2010/0001998 A1* | 1/2010 | Mandella | G06F 3/03545 |
| | | | 345/419 |
| 2011/0077082 A1* | 3/2011 | Marks | G06F 3/017 |
| | | | 463/36 |
| 2016/0334628 A1* | 11/2016 | Lyons | A63F 13/98 |
| 2016/0357249 A1* | 12/2016 | Webb | G06F 3/011 |
| 2016/0357261 A1* | 12/2016 | Bristol | A63F 13/24 |
| 2017/0330376 A1* | 11/2017 | Haseltine | G02B 27/2228 |

* cited by examiner

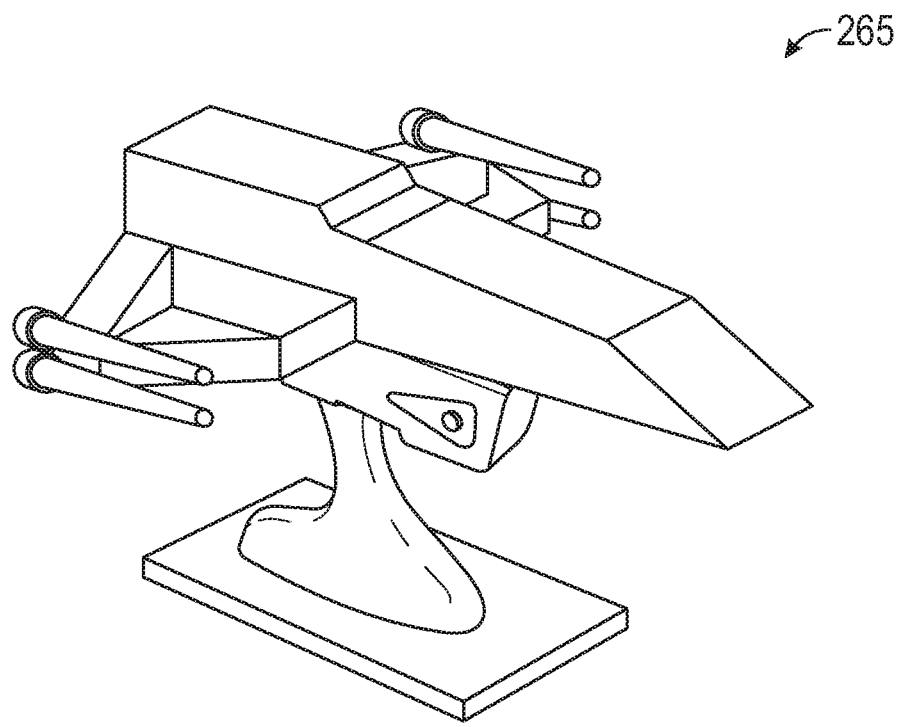
FIG. 2B
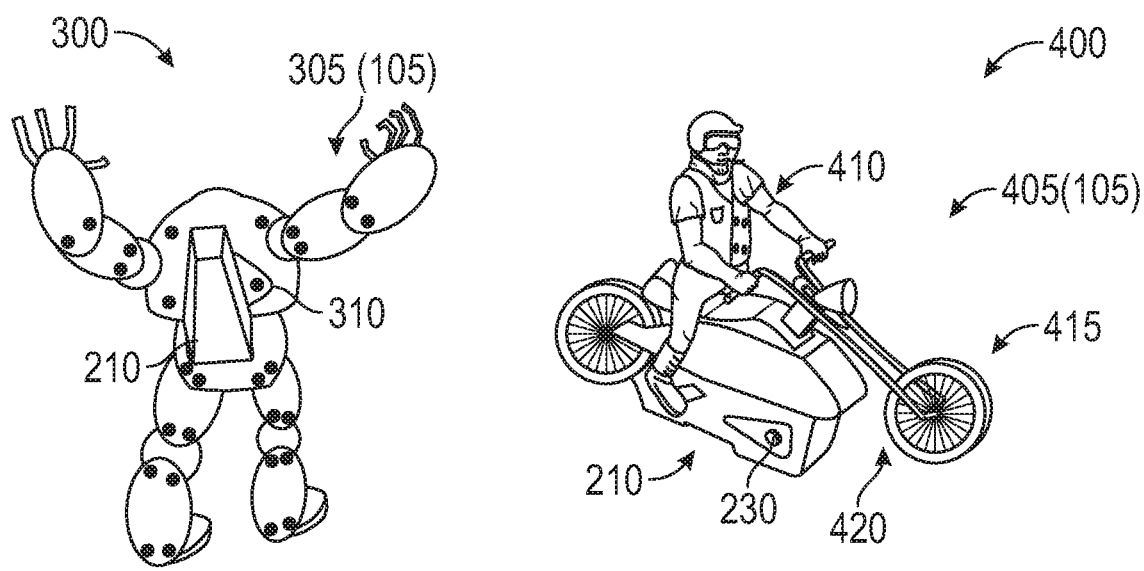
FIG. 3
FIG. 4

MODEL AND DETACHABLE CONTROLLER FOR AUGMENTED REALITY / VIRTUAL REALITY EXPERIENCE

BACKGROUND

The present disclosure generally relates to computer-based entertainment, and more specifically to models and detachable controllers suitable for use with augmented reality (AR) and/or virtual reality (VR) devices.

Computer graphics technology has significantly progressed since the first video games were developed. Relatively inexpensive 3D graphics engines now provide nearly photo-realistic interactive game play on hand-held video game, home video game, and personal computer hardware platforms costing only a few hundred dollars. These video game systems typically include a hand-held controller, game controller, or, in the case of a hand-held video game platform, an integrated controller. A user interacts with the controller to send commands or other instructions to the video game system to control a video game or other simulation. For example, the controller may include a joystick and buttons operated by the user.

While video games allow the user to interact directly with the video game system, such interactions primarily influence the graphical depiction shown on the video game device (or on a connected display), and rarely influence any other objects outside of the virtual world. That is, a user may specify an input to the video game system, indicating that the user's avatar should perform a jump action, and in response the video game system could display the user's avatar jumping. However, such interactions are typically limited to the virtual world, and any interactions outside the virtual world are limited (e.g., a hand-held gaming device could vibrate when certain actions occur).

Additionally, many hand-held gaming devices include some form of visual sensing device which may be used to capture an image or a series of images of a physical, real-world scene. The captured images can then be displayed, for instance, on a display of the hand-held gaming device. Certain devices may be configured to insert virtual objects into the captured images before the images are displayed. Additionally, other devices or applications may enable users to draw or paint particular within a captured image of a physical scene. However, as such alterations apply only to a single image of the physical scene, subsequent captured images of the physical scene from different perspectives may not incorporate the user's alterations.

SUMMARY

In one embodiment, a method comprises receiving identification information from circuitry of a model removably attached to a controller device. A power source of the controller device provides power to the circuitry. The method further comprises receiving orientation information from one or more sensors of the controller device, and identifying, using a visual sensor, one or more external visual indicators of the model. The method further comprises maintaining a virtual model representing a model type indicated by the identification information. An orientation of the virtual model is based on the orientation information and referenced to the one or more external visual indicators. The method further comprises, responsive to receiving an input, displaying one or more visual effects referenced to the virtual model.

In another embodiment, a system comprises a model comprising circuitry and one or more external visual indicators, and a controller device. The controller device comprises an interface dimensioned to removably attach to the model, a power supply configured to provide power to the circuitry when the controller device is removably attached to the model, and one or more sensors. The system further comprises a visual sensor and one or more computer processors. The one or more computer processors are configured to identify, using the visual sensor, the one or more external visual indicators. The one or more computer processors are further configured to maintain a virtual model representing a model type indicated by identification information received from the circuitry. An orientation of the virtual model is based on orientation information received from the one or more sensors and referenced to the one or more external visual indicators. The one or more computer processors are further configured to, responsive to receiving an input, displaying one or more visual effects referenced to the virtual model.

In another embodiment, a controller device comprises a body, an attachment interface dimensioned to removably attach the body to one or more models, a power supply configured to provide power to circuitry of a first model of the one or more models when the first model is removably attached to the attachment interface, one or more sensors, and a communication interface. The communication is configured to transmit identification information identifying the first model to an external computing device, transmit sensor information from the one or more sensors to the external computing device, and receive information from an application executing on the external computing device. The information corresponds to one or more actions of a virtual model within an augmented reality environment, and the virtual model corresponds to the first model. The controller device further comprises a sensory feedback device configured to provide sensory feedback with timing based on the one or more actions of the virtual model.

BRIEF DESCRIPTION OF THE DRAWINGS

So that the manner in which the above recited aspects are attained and can be understood in detail, a more particular description of embodiments of the disclosure, briefly summarized above, may be had by reference to the appended drawings. It is to be noted, however, that the appended drawings illustrate only typical embodiments of the disclosure and are therefore not to be considered limiting of its scope, for the disclosure may admit to other equally effective embodiments.

FIG. 2B illustrates an attached configuration of a model and a controller device, according to one or more embodiments.

FIGS. 3 and 4 illustrate a controller device attached to various models, according to one or more embodiments.

DETAILED DESCRIPTION

Figure 1:
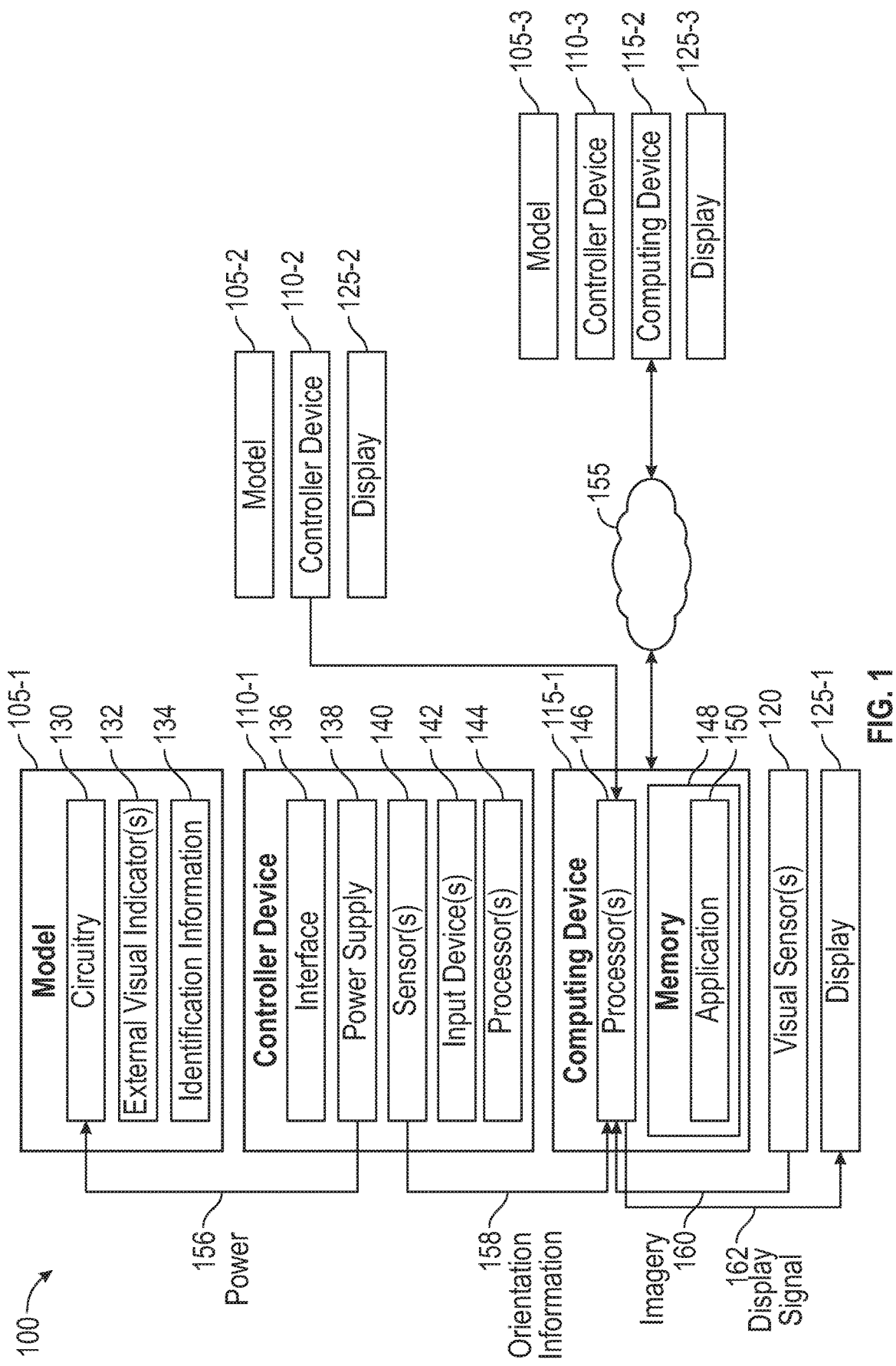
FIG. 1 illustrates an exemplary system, according to one or more embodiments.

FIG. 1 illustrates an exemplary system 100, according to one or more embodiments. The system 100 enables a virtual environment that includes one or more physical environments (e.g., supporting local interaction and/or remote interaction of one or more users).

The system 100 comprises a plurality of models 105-1, 105-2, 105-3 (generically referred to as model 105). Each model 105 is configured to removably attach to a respective controller device 110-1, 110-2, 110-3 (generically referred to as controller device 110). Each model 105 may be implemented with any suitable form, such as a vehicle model (e.g., an automobile, an aircraft, a spacecraft), a character model (e.g., a doll, figurine, action figure, animal), toys, and so forth.

Each model 105 comprises circuitry 130. In some embodiments, the circuitry 130 is communicatively coupled with one or more external power connections (e.g., for receiving power) and/or one or more external data connections (e.g., for communicating data and/or control signals with the respective controller device 110). The circuitry 130 may be implemented in any suitable form, e.g., including a processor, application-specific integrated circuit (ASIC), and/or other programmable logic. The circuitry 130 may further include sensing circuitry and/or control circuitry. The circuitry 130 may be implemented as hardware, firmware, and/or software, as well as combinations thereof.

Each model 105 further comprises one or more external visual indicators 132 that are visible at an external surface of the model 105. The external visual indicators 132 may be disposed on the external surface, or within the model 105 and visible at the external surface (e.g., light that is transmitted through an optically permissive external surface, light that is transmitted through an opening formed in the external surface).

In some embodiments, the one or more external visual indicators 132 comprise one or more passive visual indicators that are not electrically powered, and/or one or more active visual indicators that are electrically powered. Some non-limiting examples of the one or more passive visual indicators include fiducials or other distinct features or markings at the external surface. The one or more passive visual indicators may be formed in the external surface and/or attached thereto (e.g., a sticker applied to the external surface).

One non-limiting example of the one or more active visual indicators includes light emitting diodes (LEDs). In some embodiments, the circuitry 130 controls the visual appearance (e.g., arrangement, color) of the one or more active visual indicators to visually distinguish the model 105. In some embodiments, the visual appearance of the one or more active visual indicators is controlled based on detecting a presence of other models 105.

For example, the color(s) of the one or more active visual indicators may be selected as different colors to visually distinguish the different models 105. For example, the one or more active visual indicators of the model 105-1 may be controlled by the circuitry 130 to display a blue color, active visual indicator(s) of the model 105-2 may be controlled to display a red color, and active visual indicator(s) of the model 105-3 may be controlled to display a green color. Displaying distinct combinations of one or more colors is also contemplated.

In one non-limiting example, an active visual indicator includes multiple single-color LEDs each configured to display a different color, and the circuitry 130 selects a particular LED or combination of LEDs to illuminate. In another non-limiting example, an active visual indicator includes a single multi-color LED, and the circuitry 130 selects which color is displayed by the multi-color LED. In another non-limiting example, an active visual indicator includes multiple multi-color LEDs, and the circuitry 130 selects a combination of colors displayed by the multi-color LEDs.

Each model 105 further comprises identification information 134 indicating at least a model type of the respective model 105. In some embodiments, the identification information 134 is used by the computing device 115-1 to control how a virtual model representing the model 105 is maintained and/or displayed using the display 125-1. The identification information 134 may include other appearance information of the model 105 and/or virtual operation information for the virtual model.

In some embodiments, the identification information 134 is stored in a non-volatile memory of the circuitry 130, and accessible when the controller device 110 is attached to the model 105. Stated another way, the non-volatile memory may be communicatively coupled with the one or more external data connections. In one non-limiting example, the identification information 134 is stored in radio-frequency identification (RFID) circuitry that couples with the controller device 110 when the controller device 110 is attached to the model 105.

Each controller device 110 comprises an interface 136 (also described as an attachment interface) that is configured to removably attach to a model 105. In some cases, the interface 136 of each controller device 110 is dimensioned to interchangeably attach to each model 105-1, 105-2, 105-3. In some embodiments, the interface 136 includes one or more mechanical features that mate with a corresponding one or more mechanical features of the model 105. In one non-limiting example, the interface 136 may include a recessed portion (e.g., a slot) configured to receive a projecting portion (e.g., a tab) of the model 105. In some embodiments, the interface 136 and/or the model 105 include one or more retaining features that maintain the model 105 in the attached configuration with the controller device 110. In one non-limiting example, the interface 136 or the model 105 comprises a mechanical latch. In another non-limiting example, the interface 136 and the model 105 include complementary magnets.

Each controller device 110 may be implemented in any suitable form. In some embodiments, the controller device 110 is formed to include a handle that may be gripped by a user's hand, so that when the controller device 110 is attached to the model 105, a user may manipulate the model 105 when gripping the handle.

In some embodiments, each controller device 110 comprises a power supply 138 that supplies electrical power 156 to the circuitry 130 when the controller device 110 is attached to the model 105. The power source of the power supply 138 may have any suitable form, such as a rechargeable or replaceable battery. In some embodiments, the electrical power 156 is supplied to the circuitry 130 over one or more conductive connections at the interface 136. In other embodiments, the electrical power 156 is supplied wirelessly to the circuitry 130 (e.g., inductive charging).

Each controller device 110 further comprises one or more sensors 140, one or more input devices 142, and one or more computer processors 144. In some embodiments, the power supply 138 further supplies electrical power to the one or more sensors 140, the one or more input devices 142, and/or the one or more computer processors 144. The one or more computer processors 144 are communicatively coupled with the interface 136, with the one or more sensors 140, and with the one or more input device 142. The one or more computer processors 144 may be implemented in any suitable form, such as a general purpose microprocessor, a controller, an application-specific integrated circuit (ASIC), and so forth.

The one or more computer processors 144 are configured to receive the identification information 134 from the model 105. The one or more computer processors 144 may further communicate the identification information 134 to one or more computer processors 146 of the respective computing device 115-1, 115-2 (generically referred to as computing device 115). In some embodiments, the one or more computer processors 144 are communicatively coupled wirelessly with the one or more computer processors 146 using any suitable wireless protocols, whether standardized or proprietary.

In some embodiments, the one or more sensors 140 comprise an inertial measurement unit comprising an accelerometer, a gyroscope, and/or a magnetometer. Orientation information 158, which describes an orientation of the controller device 110 and/or the model 105 when attached, is provided by the one or more sensors 140 and communicated by the one or more computer processors 144 to the one or more computer processors 146 of the computing device 115. The one or more input devices 142 may be implemented in any suitable form, such as one or more buttons located on the controller device 110. User input provided through the one or more input devices 142 is communicated by the one or more computer processors 144 to the one or more computer processors 146.

In some embodiments, each controller device 110 further comprises a sensory feedback device configured to provide sensory feedback. In some embodiments, the sensory feedback device comprises a force feedback motor, although other types of sensory feedback are also contemplated. In some embodiments, a timing of the sensory feedback is based on one or more actions of a virtual model within an augmented reality environment, wherein the virtual model corresponds to the model 105-1. For example, a force feedback motor may provide a vibration responsive to the virtual model colliding with a virtual object in the augmented reality environment, responsive to an input at the one or more input devices 142 (e.g., corresponding to firing a blaster in the augmented reality environment), and so forth.

Each computing device 115 may be implemented in any suitable form. In some embodiments, the computing device 115 is integrated in a wearable device that supports AR and/or VR display (e.g., an AR/VR headset). In some embodiments, the computing device 115 comprises a mobile computing device, whether handheld (e.g., a smartphone, a tablet) or body-wearable (e.g., a watch, an eyepiece). In some embodiments, the mobile computing device may be removably attached to the AR/VR-enabled wearable device. Other types of the computing device 115 are also contemplated, such as a desktop computer and a laptop computer.

The one or more computer processors 146 of the computing device 115 may be implemented in any suitable form, such as a general purpose microprocessor, a controller, an application-specific integrated circuit (ASIC), and so forth. A memory 148 of the computing device 115 may include a variety of computer-readable media selected for their size, relative performance, or other capabilities: volatile and/or non-volatile media, removable and/or non-removable media, etc.

The memory 148 may include one or more modules for performing various functions described herein. In one embodiment, each module includes program code that is executable by the one or more computer processors 146. However, other embodiments may include modules that are partially or fully implemented in hardware (i.e., circuitry) or firmware of the computing device 115. As shown, the memory 344 comprises an application 150 that manages the virtual environment, which may be implemented in any suitable form. For example, the application 150 may be implemented as a game providing a gameplay environment for the user having any suitable form, such as an action game, an adventure game, a role-playing game, a simulation game, a strategy game, a sports game, a party game, a trivia game, an educational game, and so forth.

The system 100 further comprises one or more visual sensors 120 and displays 125-1, 125-2, 125-3 (generically referred to as display 125). The one or more visual sensors 120 may have any suitable implementation, such as a visual camera or an infrared camera. The one or more visual sensors 120 provide imagery 160 to the one or more computer processors 146 of the computing device 115-1. Each display 125 includes any type of dynamic display capable of displaying a visual interface to a user, and may include any type of light emitting diode (LED), organic LED (OLED), liquid crystal display (LCD), plasma, electroluminescence (EL), or other display technology. The one or more computer processors 146 provide a display signal 162 to the display 125. In some embodiments, the one or more visual sensors 120 and/or the display 125 are external to the computing device 115. In some embodiments, the visual sensors 120 and/or the display 125 are integrated into the computing device 115 (e.g., a camera and a display included in a mobile computing device).

In some embodiments, the application 150 provides an AR experience that combines physical elements from the physical environment with virtual elements that are displayed on the display 125. During exemplary operation of the system 100, a user holds the controller device 110 attached to the model 105. The one or more visual sensors 120 transmit imagery 160, and the one or more processors 146 perform image processing on the imagery 160 to identify one or more external visual indicators 132 of the model 105. The application 150 receives the identification information 134 and the orientation information 158 provided by the one or more sensors 140. The application 150 generates and maintains a virtual model representing a model type indicated by the identification information 134, which in some cases is displayed using the display 125. A location of the virtual model relative to the display 125 is referenced to the identified one or more external visual indicators 132, and an orientation of the virtual model is based on the orientation information 158. The orientation may be based further on the identified one or more external visual indicators 132 (e.g., the relative arrangement of a plurality of external visual indicators 132 identified in the imagery 160). The application 150 dynamically updates the position, orientation, and/or visual depiction of the virtual model based on the one or more external visual indicators 132 and/or the orientation information 158.

In some embodiments, the application 150 receives the user input provided through the one or more input devices 142, and causes one or more visual effects to be displayed using the display 125. The one or more visual effects are referenced to the virtual model. For example, the visual effects may illustrate operation of the virtual model (e.g., using a spacecraft example, displaying rocket thrust, firing energy blasters, and/or collision with an virtual object) and/or a condition of the virtual model (e.g., displaying components as worn or damaged and/or visual effects such as smoke or fire).

In some embodiments, the application 150 generates information (e.g., control signals) that are communicated to the controller device 110. In one non-limiting example, control signals may be communicated to the circuitry 130 (via the controller device 110) to control the visual appearance of the one or more active visual indicators of the model 105. In another non-limiting example, control signals may be communicated to one or more output devices (e.g., to produce an audio effect using a speaker included in the controller device 110 or in the model 105). In another non-limiting example, the control signals correspond to one or more actions of a virtual model within an augmented reality environment (e.g., administered by the application 150), and the virtual model corresponds to the model 105-1.

The model 105-2 is attached to the controller device 110-2, which is communicatively coupled wirelessly with the one or more computer processors 146. The controller device 110-2 and/or the one or more computer processors 146 are also communicatively coupled wirelessly with the display 125-2. In this way, the application 150 executing on the computing device 115-1 may support an interactive AR experience for multiple controller devices 110-1, 110-2 and multiple users in a local environment.

The model 105-3 is attached to the controller device 110-3, which is communicatively coupled wirelessly with the computing device 115-2. The computing device 115-2 is further communicatively coupled wirelessly with the display 125-3, as well as with the computing device 115-1 via a network 155. The network 155 may include one or more networks of various types, including a local area or local access network (LAN), a general wide area network (WAN), and/or a public network (e.g., the Internet). In some embodiments, an application 150 also executes on the computing device 115-2, such that the applications 150 support an interactive AR experience for multiple controller devices 110-1, 110-3 and multiple users in a local environment or remote environments.

Beneficially, by including more components in the controller device 110, which is interchangeable between different models 105, the models 105 may be produced with a reduced manufacturing cost. Additionally, using a user's mobile computing device as the computing device 115 may support reduced costs for the AR/VR experience, as no separate computing hardware or display hardware need be included.

Figure 2A:
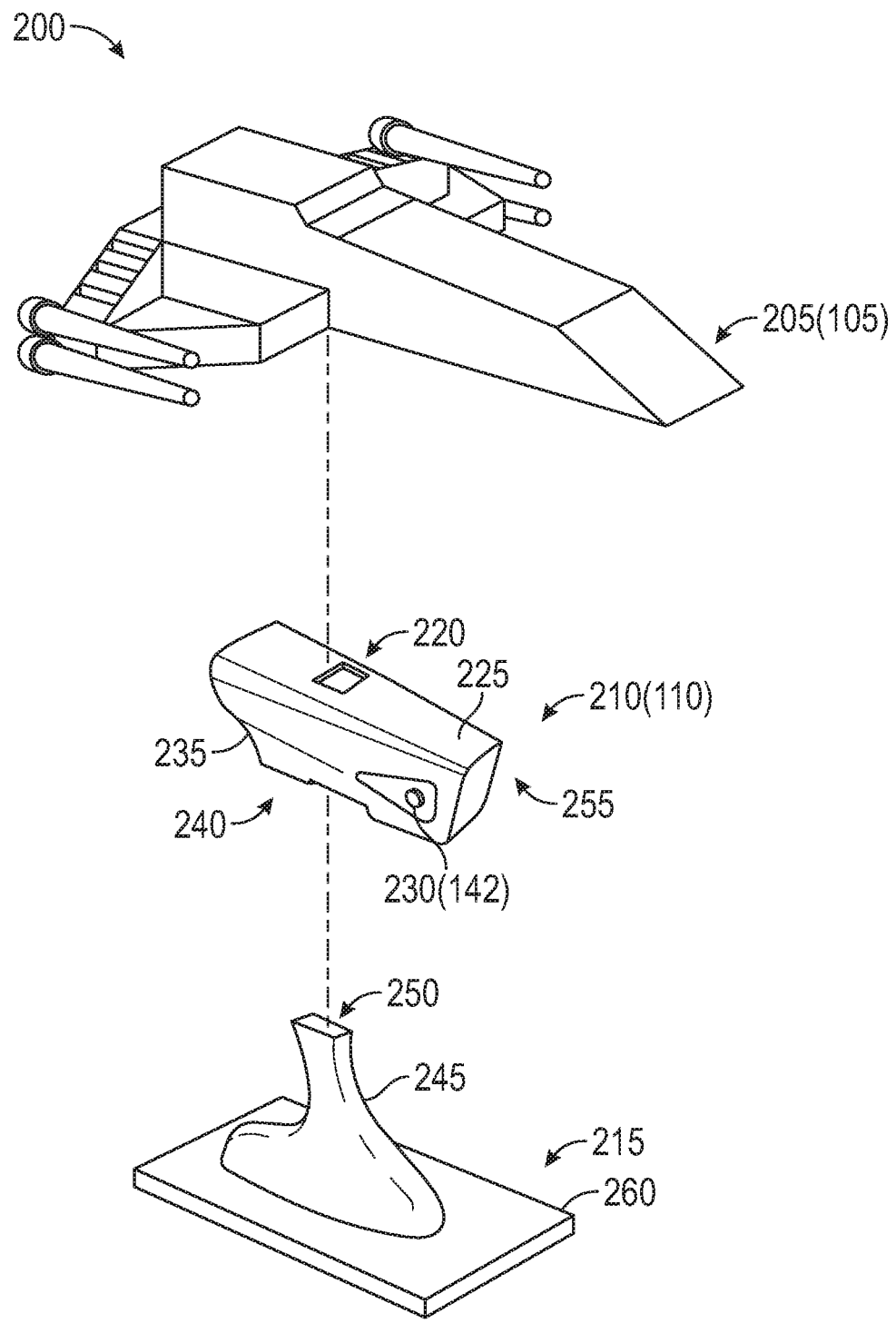
FIG. 2A illustrates a detached configuration of a model and a controller device, according to one or more embodiments.

FIG. 2A illustrates a detached configuration of a model and a controller device, according to one or more embodiments. FIG. 2B illustrates an attached configuration of the model and the controller device. The features illustrated in diagrams 200, 265 may be used in conjunction with other embodiments, such as being included in the system 100 of FIG. 1.

In the diagram 200, a spacecraft 205 is one example of the model 105 of FIG. 1. A controller device 210 is one example of the controller device 110. A body 255 of the controller device 210 includes a top surface 225, a side surface 235, and a bottom surface 240. A button 230 (one example of the input device 142) extends from the side surface 235 of the body 255. In some embodiments, the body 255 is contoured as a handle to be gripped by a user's hand. In some embodiments, the power supply, the one or more sensors, and/or the sensory feedback device of the controller device 210 are included in the body 255, although this is not a requirement.

An opening 220 formed in the top surface 225 is dimensioned to receive a corresponding projecting feature of the spacecraft 205. In this way, the opening 220 serves as an attachment interface that is dimensioned to removably attach the body 255 to one or more models (i.e., including the spacecraft 205). In some embodiments, when the projecting feature is inserted into the opening 220, attaching the body 255 to the spacecraft 205, conductive connections on the projecting feature and internal to the body 255 are connected together, allowing power and/or data to be communicated between circuitry included in the spacecraft 205 and the controller device 210. Other arrangements of the conductive connections are also contemplated, as well as other types of connections (e.g., inductive connections that wirelessly couple the spacecraft 205 and the controller device 210).

A base 215 is configured to removably attach with the controller device 210 at the bottom surface 240. In this way, the spacecraft 205 attached to the controller device 210 may be set onto the base 215 when not being held or otherwise manipulated by a user. In some embodiments, the base 215 is additionally or alternately configured to removably attach with the spacecraft 205 (e.g., at a bottom surface of the spacecraft 205). In this way, the base 215 may be configured to removably attach to different models and/or types of models for a single controller device 210.

The base 215 comprises an arm 245 extending to a top surface 250 and a baseplate 260. In some embodiments, the top surface 250 may include a projecting feature that is dimensioned to be received into an opening formed in the bottom surface 240. Although not shown, the base 215 may include one or more conductive connections for connecting with the controller device 210. For example, the base 215 may include a power supply connected to wall power, and the one or more conductive connections supply electrical power from the power supply of the base 215 to the power supply included in the controller device 210 (e.g., a rechargeable battery).

FIGS. 3 and 4 illustrate a controller device attached to various models, according to one or more embodiments. For example, diagram 300 illustrates an action FIG. 305 (one example of the model 105) having the controller device 210 attached to a back 310 of the action FIG. 305. Diagram 400 illustrates a model 405 (one example of the model 105) comprising a rider 410 riding a motorcycle 415. In some cases, the rider 410 is detachable from the motorcycle 415. The controller device 210 is attached to a lower surface 420 of the motorcycle 415.

Figure 5:
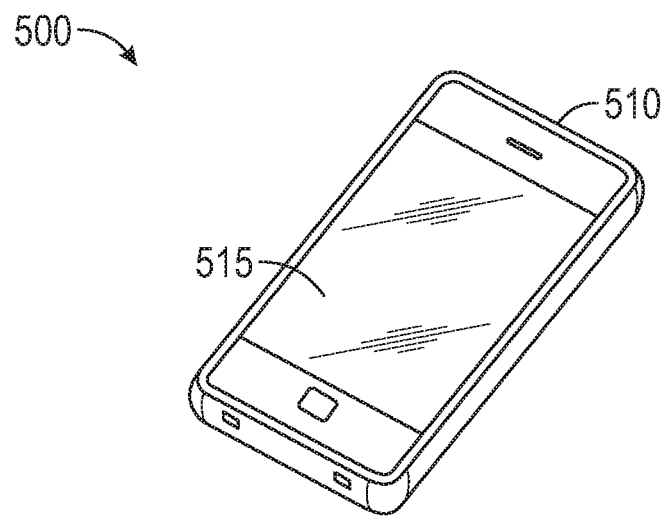
FIG. 5 is a diagram illustrating an AR/VR headset configured to interact with a mobile computing device, according to one or more embodiments.
Figure 5:
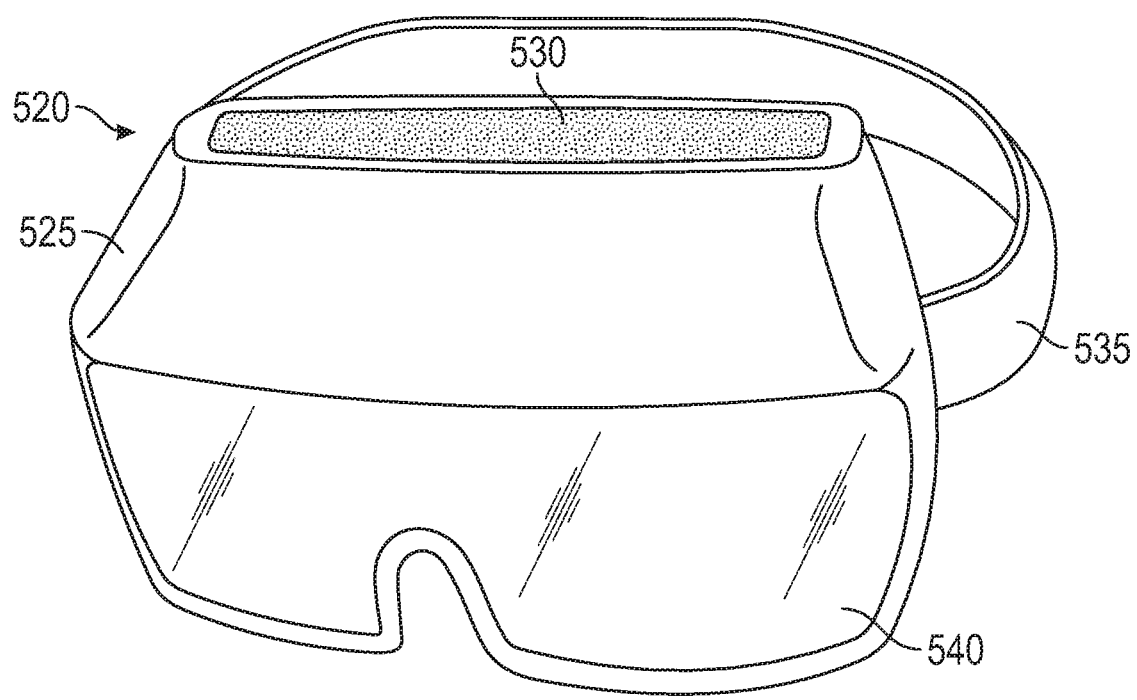

FIG. 5 is a diagram 500 illustrating an AR/VR headset 520 configured to interact with a mobile computing device 510, according to one or more embodiments. The features depicted in the diagram 500 may be used in conjunction with other embodiments, such as being included in the system 100 of FIG. 1.

As shown, the diagram 500 depicts a mobile computing device 510 and an AR/VR-capable display device in the form of an AR/VR headset 520. The AR/VR headset 520 generally includes a mount assembly 525 (or "mobile device adapter"), a headstrap 535, and a mirrored lens 540. The mount assembly 525 defines an opening 530 into which the mobile computing device 510 is received. Generally, insertion of the mobile computing device 510 into the opening 530 provides a removable attachment of the mobile computing device 510 with the mount assembly 525 and further arranges the display 515 (representing an example of the display 125 of FIG. 1) with a predefined position. In the predefined position, the display 515 has a suitable orientation relative to optical components (not shown) included in the AR/VR headset 520. The mount assembly 525 may include any suitable means for removably attaching the mobile computing device 510. The mount assembly 525 is further configured to hold or retain the mobile computing device 510 with a desired position and orientation relative to a wearer of the AR/VR headset 520.

The light generated by the display 515 of the mobile computing device 510 (e.g., based on the display signal 162 of FIG. 1) is redirected through the optical components of the AR/VR headset 520 so that the light can be seen by a wearer of the AR/VR headset 520. For example, the generated light could pass through a beam-splitter and reflect off the mirrored lens 540 and into the wearer's eyes. Thus, virtual objects that are displayed using the display 515 appear as if present within the physical environment of the viewer. Advantageously, by leveraging the hardware resources of the mobile computing device 510, the AR/VR headset 520 can be produced and sold at reduced costs, relative to other AR devices containing dedicated computer processors, display devices, and so forth.

Figure 6:
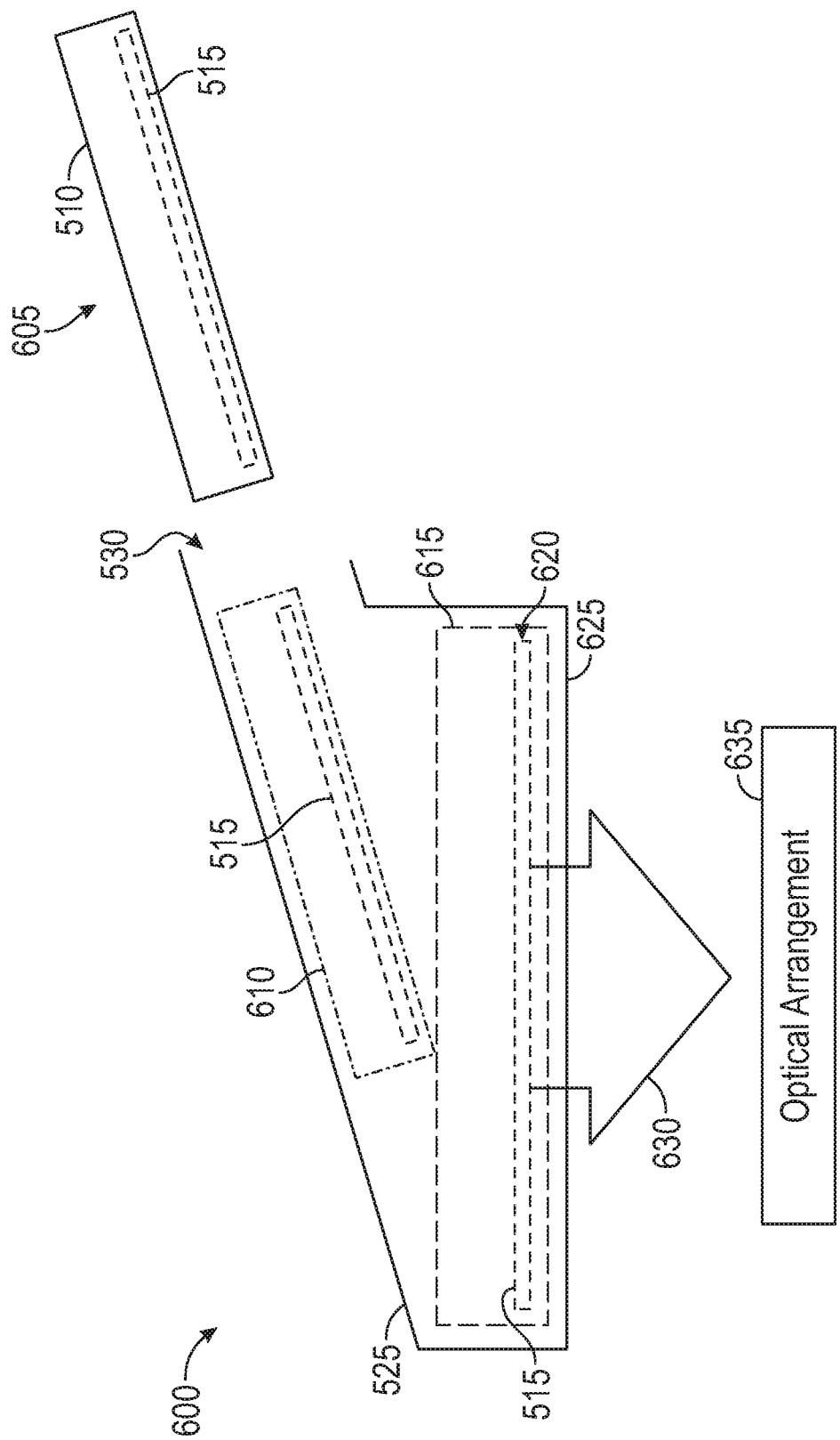
FIG. 6 is a diagram illustrating attachment of a mobile computing device with a mount assembly, according to one or more embodiments.

FIG. 6 is a diagram 600 illustrating attachment of a mobile computing device 510 with a mount assembly 525, according to one or more embodiments. More specifically, diagram 600 depicts an exemplary sequence for inserting the mobile computing device 510 into the mount assembly 525. The mount assembly 525 may be formed of one or more elements of any material having suitable strength for retaining the mobile computing device 510. In some embodiments, the mount assembly 525 is formed of a plastic material, which advantageously provides a lighter display device.

From an initial position 605 external to the mount assembly 525, the mobile computing device 510 is inserted through the opening 530 formed in the mount assembly 525. An intermediate position 610 represents a possible positioning of the mobile computing device 510 before reaching a predefined final position 615. At the predefined final position 615 of the mobile computing device 510, the display 515 of the mobile computing device 510 has a predefined position 620 relative to an optical arrangement 635.

A lower surface 625 of the mount assembly 525 is generally optically transmissive of light 630 generated by the display 515. In some embodiments, the lower surface 625 is formed of an optically transmissive material, such as a plastic or glass, through which light 630 from the display 515 is transmitted. In other embodiments, the lower surface 625 defines an opening through which light 630 from the display 515 is transmitted. For example, the lower surface 625 may support the mobile computing device 510 around a periphery of the mobile computing device 510.

Although not explicitly shown, the mount assembly 525 may include further elements for removably attaching the mobile computing device 510 with the mount assembly 525. For example, a press fit may be formed between the mobile computing device 510 and the mount assembly 525 using adjustable corner piece(s), a sliding tray with guide plug, toggle pin(s), a stepped slot, a replaceable tray, etc. For example, the mobile computing device 510 may be inserted into a replaceable tray or other suitable carrier member, which is then inserted to the mount assembly 525 to thereby arrange the display 515 with the predefined position 620. In this way, different carrier members may be used to accommodate different types of mobile computing devices 510 for a particular mount assembly 525.

The removable attachment of the mobile computing device 510 with the mount assembly 525 may have any suitable orientation within an associated display device. The elements of the optical arrangement 635 collectively define a field of view relative to a predefined optical reference point, and the display device is generally designed such that the eye(s) of the viewer is aligned with the optical reference point. To support an AR capability of the display device, the mobile computing device 510 and the mount assembly 525 are generally disposed outside of the field of view to allow a viewer to observe the physical environment through the optical arrangement 635. For example, for a head-worn display device in which a line of sight of the viewer corresponds to the field of view of the optical arrangement 635, the mobile computing device 510 and mount assembly 525 may be positioned above, below, or to a side of the viewer's line of sight.

Figure 7:
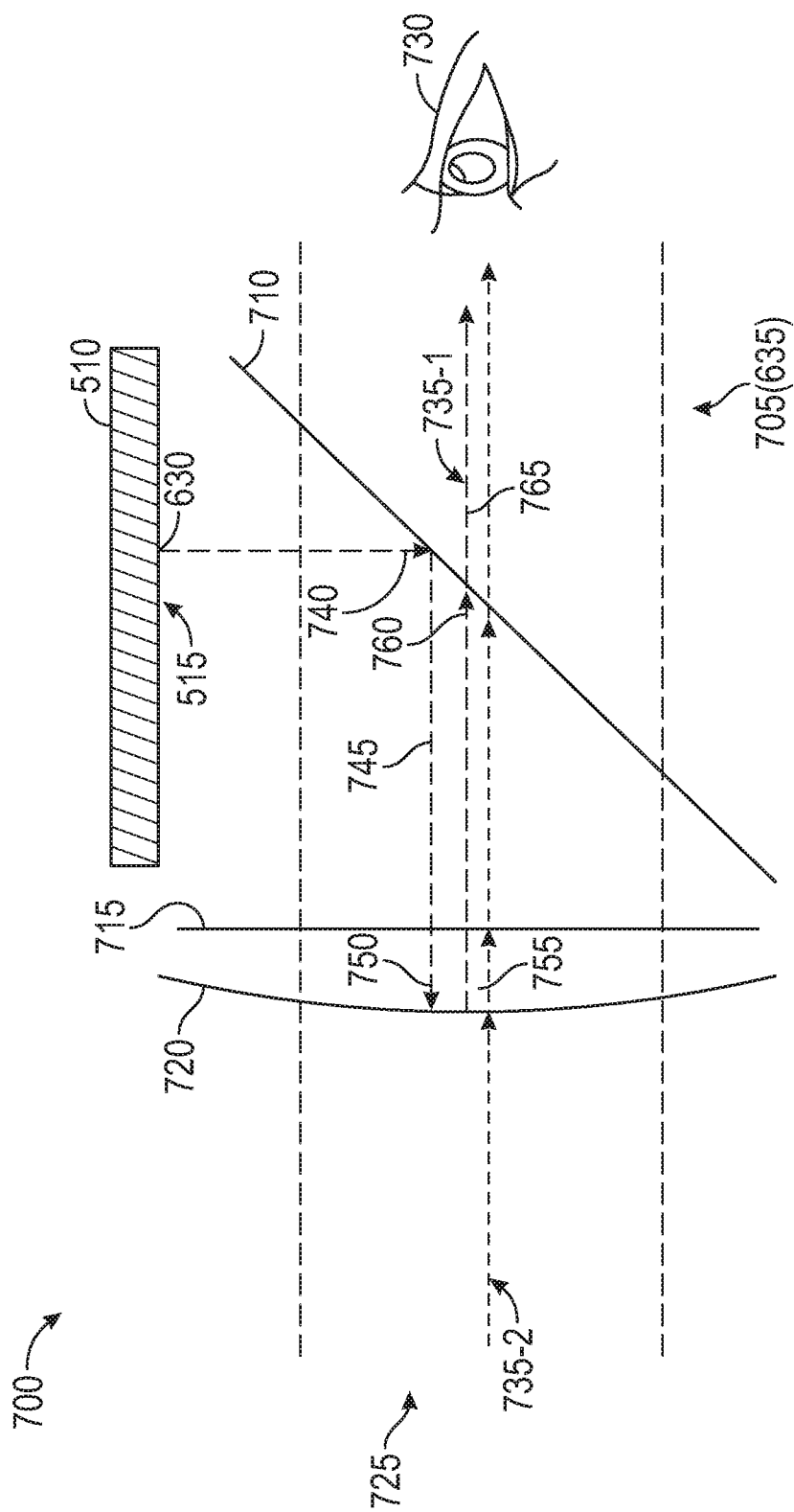
FIG. 7 illustrates an exemplary implementation of an AR/VR display device, according to one or more embodiments.

FIG. 7 illustrates an exemplary implementation of a compact AR/VR display device 700, according to one embodiment. More specifically, FIG. 7 depicts an exemplary arrangement of the mobile computing device 510 and an optical arrangement 705 (one example of the optical arrangement 635 of FIG. 6) after placement of the mobile computing device 510 in the mount assembly 525 (e.g., as depicted in FIG. 6).

The optical arrangement 705 is configured to reflect at least a portion of light 630 from the display 515 to an eye 730 of a viewer. The elements of the optical arrangement 705 collectively define a field of view 725 relative to a predefined optical reference point. The display device 700 is generally designed such that the eye 730 of the viewer is aligned with the optical reference point, e.g., when worn by the viewer.

As shown, the mobile computing device 510 is arranged with its display 515 facing in a downward direction (that is, relative to the perspective of the viewer). However, alternate orientations of the display 515 relative to the viewer's perspective are also possible, such as upward-facing, sideways-facing, etc. The optical arrangement 705 defines a first optical path 735-1 that extends from the display 515 to a beam splitter element 710, reflected by the beam splitter element 710 through a quarter-wave plate element 715 to a surface of a mirror element 720, reflected by the mirror element 720 through the quarter-wave plate element 715 and through the beam splitter element 710 to the optical reference point. The optical arrangement 705 further defines a second optical path 735-2 extending from one or more objects in the environment through the mirror element 720, through the quarter-wave plate element 715, and through the beam splitter element 710 to the optical reference point.

The light 630 (or "imagery") generated by the display 515 is transmitted in the downward direction towards the beam splitter element 710. In some embodiments, the display 515 is a non-polarized display and the light 630 is non-polarized. In other embodiments, the display 515 is a polarized display and the light 630 is polarized.

In one example, the light 630 is linearly polarized (whether in s-polarization or p-polarization), and the beam splitter element 710 has a polarization axis that is rotated a net 90° from the polarization axis of the light 630. Based on the light 630, a first incident light 740 is incident on the beam splitter element 710, and a first portion 745 of the first incident light 740 is reflected onto the field of view 725. Because the light 630 has a polarization axis that is rotated from the polarization axis of the beam splitter element 710, the first portion 745 comprises a majority of the first incident light 740.

The first portion 745 passes through the quarter-wave plate element 715 (or "quarter-wave retarder"), which transforms the linear polarization of the first portion 745 into a circular polarization. The circularly polarized light is incident on the mirror element 720 as second incident light 750, and a second portion 755 of the second incident light 750 is reflected off the mirror element 720. The second portion 755 passes through the quarter-wave plate element 715, which transforms the circularly polarized light into linearly polarized light with a net 90°-rotated polarization from the polarization axis of the polarized beam splitter element 710. A third incident light 760 is incident on the beam splitter element 710, and a third portion 765 is transmitted by the beam splitter element 710. Because the polarization axis of the third incident light 760 and the polarization axis of the beam splitter element 710 are aligned, the third portion 765 comprises a majority of the third incident light 760. In this way, losses are reduced at each incidence of the light on the beam splitter element 710.

The implementation of the display device 700 also increases the amount of light from background objects that is transmitted through the mirror element 720 and the beam splitter element 710 to the viewer's eye 730. When light from background objects passes through the polarized surface of the mirror element 720, the light becomes linearly polarized and the quarter-wave plate element 715 transforms the polarization of this light so that a larger percentage passes through the beam splitter element 710. The net effect of adding the polarizing reflective surface to the mirror element 720, in combination with the quarter-wave plate element 715, is to significantly increase the amount of light that reaches the viewer's eye 730, both light 630 emitted from the display 515 and light from the background objects viewed through the optics of optical arrangement 705.

Although not shown, the optical arrangement 705 may further include a mask that is configured to block light from some of the display area of the display 515 and/or from other portions of the mobile computing device 510 to prevent these portions from being seen by the viewer. For example, a mask may be provided to prevent edges of the mobile computing device 510 from being visible within the field of view 725, which tends to distract the viewer from the immersive nature of the interactive environment.

Although not shown, the optical arrangement 705 may further include a light-blocking assembly disposed within the field of view 725. In some embodiments, the light-blocking assembly comprises cross polarizers. When one or both of the cross polarizers are rotated, the amount of light from the physical environment that is transmitted to the viewer's eyes (e.g., through the beam splitter element 710) can be controlled to substantially isolate the field of view 725 from the physical environment (e.g., corresponding to a selected VR mode). Stated another way, the light-blocking assembly may be used to selectively isolate the optical path 735-2. Rotating the cross polarizers may be performed manually (e.g., the viewer turns a knob linked with the cross polarizers) or electronically. For example, a motor linked with the cross polarizers receives control signals from an associated computing device (such as the mobile computing device 510) and rotates the cross polarizers based on a selected AR or VR display mode. In other embodiments, the light-blocking assembly includes a partially or fully transmissive "see-through" display, such as an OLED or a side-lit or naturally-lit LCD. In this case, the partially or fully transmissive display receives control signals from the associated computing device and selectively darkens the display based on the selected AR or VR display mode.

Although not shown, a camera included in the mobile computing device 510 may be used as the visual sensor 120 of FIG. 1. For example, the camera may be included on an opposite surface from the display 515. The display device 700 may further include a second mirror element configured to reorient a sensing axis of the camera. In some embodiments, the camera senses in the forward direction corresponding to an axis of the field of view 725. In this orientation, the camera is able to acquire visual information for the environment for performing optical detection and tracking, depth estimation, and so forth. The second mirror element can be as simple as a single 90° fold mirror, or can be more complex including multiple mirrors and/or different mirror curvatures. In another implementation, the camera of the mobile computing device 510 may be included on the same surface as the display 515.

Figure 8A:
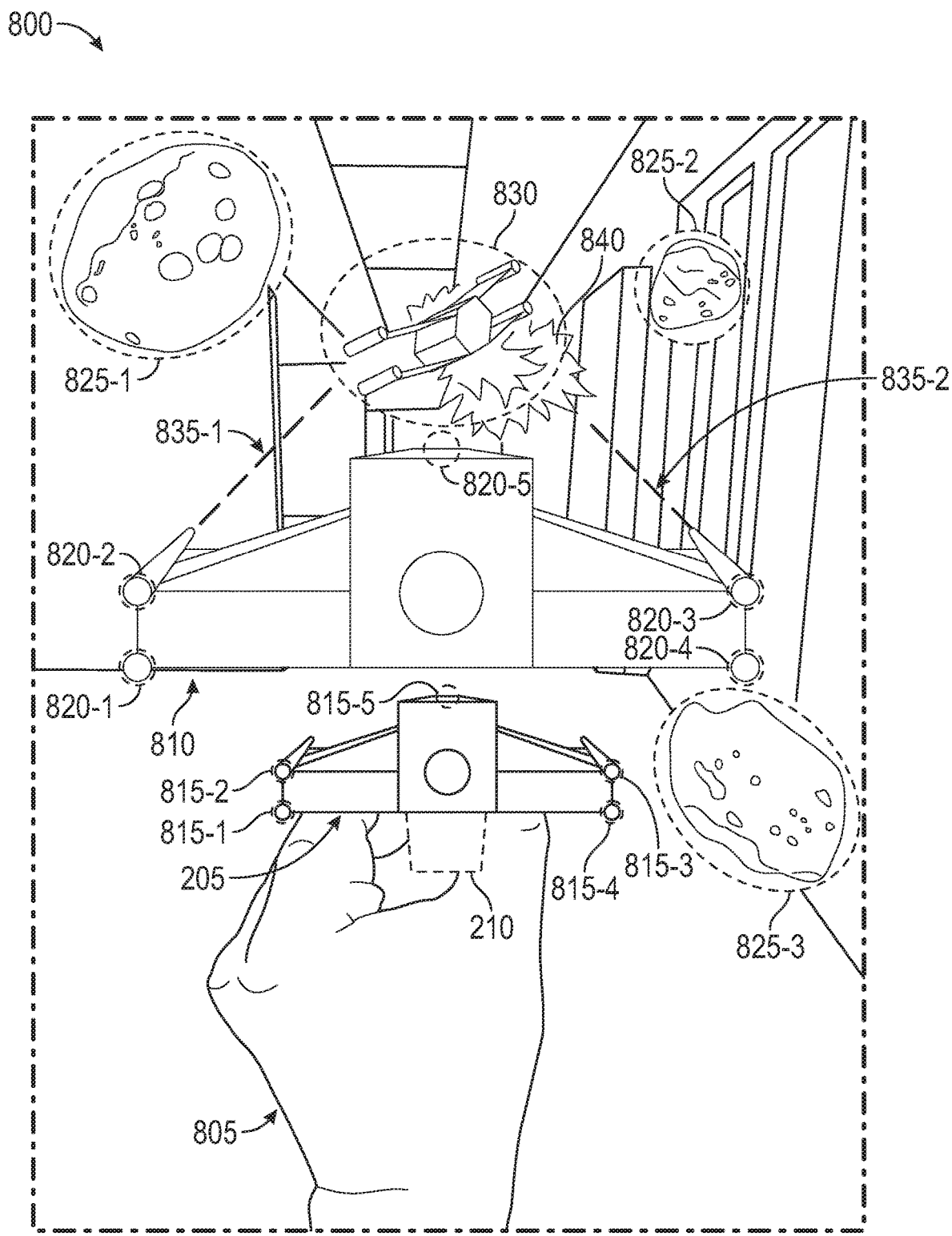
FIGS. 8A and 8B illustrate an exemplary AR display with a virtual model, according to one or more embodiments.
Figure 8B:
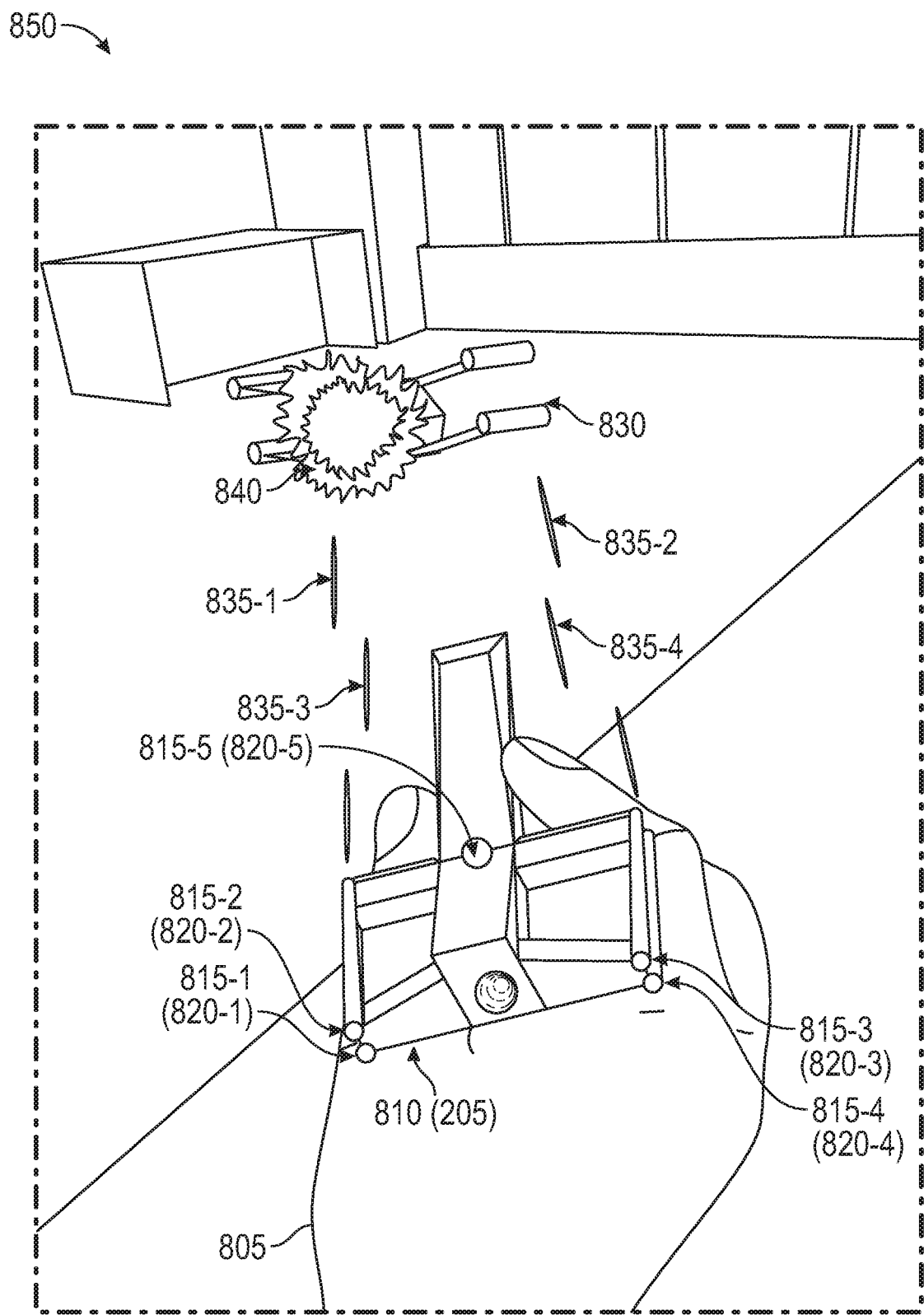

FIGS. 8A and 8B illustrate an exemplary AR display with a virtual model, according to one or more embodiments. The features illustrated in diagrams 800, 850 may be used in conjunction with other embodiments, such as being generated using the system 100 of FIG. 1.

The diagram 800 represents a field of view of a user, as viewed through an AR-capable headset (e.g., using the display device 700 of FIG. 7). A hand 805 of the user is visible in the field of view. The hand 805 is gripping the controller device 210 attached to the spacecraft 205. Although not called out with reference numbers, other background objects of the physical environment remain visible in the field of view.

A virtual model 810 corresponding to the spacecraft 205 is also depicted in the diagram 800. The spacecraft 205 includes a plurality of external visual indicators 815-1, 815-2, 815-3, 815-4, 815-5. As discussed above, a visual sensor acquires imagery including the external visual indicators 815-1, 815-2, 815-3, 815-4, 815-5, and the external visual indicators 815-1, 815-2, 815-3, 815-4, 815-5 are identified to determine at least the model type of the spacecraft 205.

The display of the virtual model 810 in the field of view is referenced to the external visual indicators 815-1, 815-2, 815-3, 815-4, 815-5, which are depicted as various components 820-1, 820-2, 820-3, 820-4, 820-5 of the virtual model 810. Further, an orientation of the virtual model 810 is based on the orientation information provided by one or more sensors of the controller device 210.

The field of view also includes a plurality of virtual objects displayed relative to the virtual model 810: asteroids 825-1, 825-2, 825-3, and an opposing spacecraft 830. In some cases, the opposing spacecraft 830 is a virtual model corresponding to another model attached to another controller device, but this is not a requirement. In one non-limiting example, the user may, by manipulating the disposition of the spacecraft 205, navigate the virtual model 810 to avoid collisions with the asteroids 825-1, 825-2, 825-3 and/or the opposing spacecraft 830.

The user may provide input to perform virtual actions using the virtual model 810. For example, by pressing a button of the controller device 210, the virtual model 810 fires energy blasters based on the orientation of the virtual model 810. As shown, the virtual model 810 is oriented such that the energy blasters are "aimed" at the opposing spacecraft 830. Visual effects 835-1, 835-2 referenced to the virtual model 810 are displayed when the energy blasters are fired (e.g., when an input device is pressed by the user). As shown, the visual effects 835-1, 835-2 include both the virtual model 810 and the opposing spacecraft 830. In response to registering a "hit" by the energy blasters, a visual effect 840 (here, a flame effect) is displayed at the opposing spacecraft 830. In some embodiments, the visual effect 840 indicates virtual damage occurring to the opposing spacecraft 830.

As shown, the virtual model 810 provides a substantial replica of the spacecraft 205, and is magnified and arranged above the spacecraft 205 in the field of view. However, any alternate magnification and/or arrangement of the virtual model 810 relative to the spacecraft 205 is also contemplated. Further, the virtual model 810 need not be a replica of the spacecraft 205, but may be more or less detailed as suitable. In one non-limiting example, the virtual model 810 is a polygonal model representing basic structures of the spacecraft 205, such as the fuselage and wings. In another non-limiting example, and as depicted in the diagram 850, the virtual model 810 is overlaid with the spacecraft 205, such that the virtual model 810 appears invisible to the user. In the diagrams 800, 850, the position and orientation of the virtual model 810 is updated as the spacecraft 205 is manipulated by the user. The virtual model 810 is used to apply visual effects 835-1, 835-2, 835-3, 835-4, and/or detect collisions with virtual objects in the environment.

Figure 9:
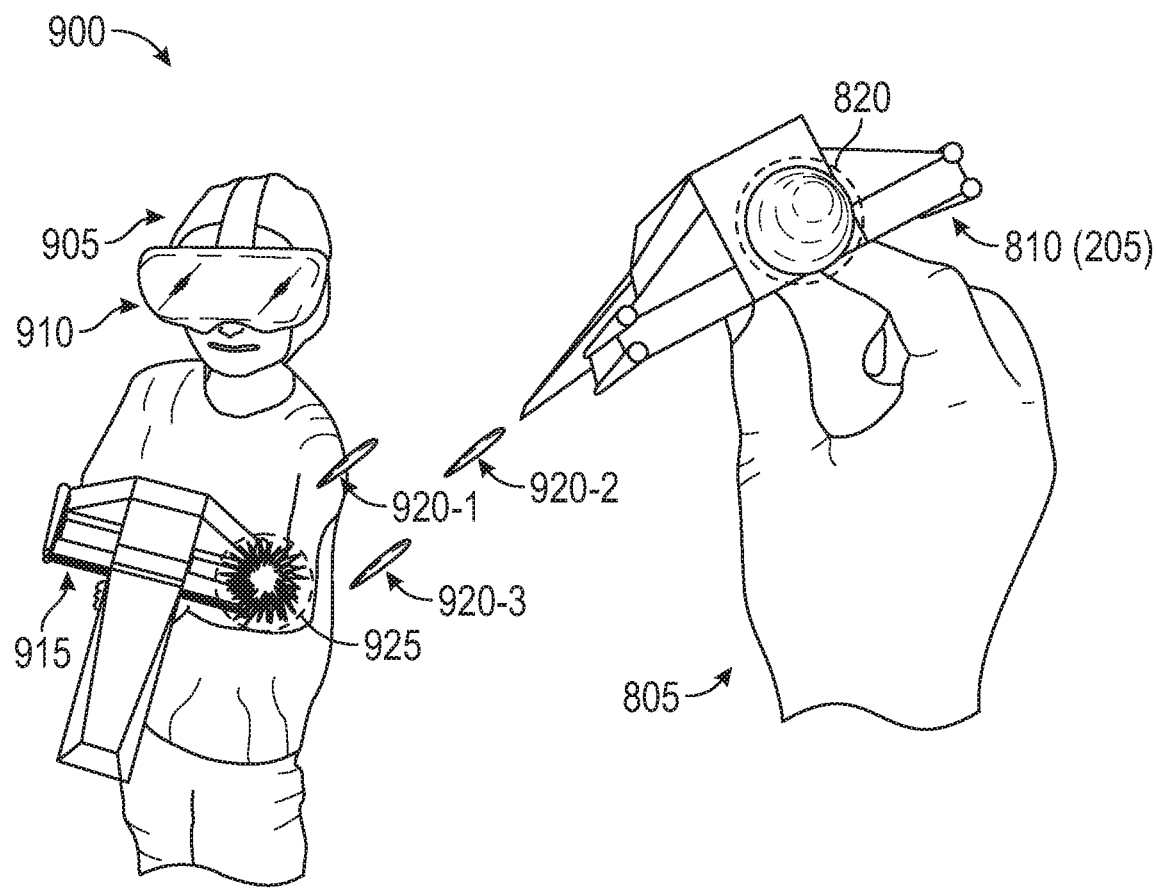
FIG. 9 illustrates an exemplary AR display with multiple virtual models, according to one or more embodiments.

FIG. 9 illustrates an exemplary AR display with multiple virtual models, according to one or more embodiments. The features illustrated in diagram 900 may be used in conjunction with other embodiments, such as being generated using the system 100 of FIG. 1.

The diagram 900 represents a field of view of a user, as viewed through an AR-capable headset (e.g., using the display device 700 of FIG. 7). The hand 805 of the user is visible in the field of view. The virtual model 810 includes a single external visual indicator 820. As shown, the virtual model 810 is overlaid with the spacecraft 205, although this is not a requirement.

Another user 905 wearing an AR/VR headset 910 is holding another model, which is overlaid by a second virtual model 915. In response to user input at the controller device attached to the spacecraft 205, virtual effects 920-1, 920-2, 920-3 corresponding to firing energy blasters are displayed referenced to the virtual model 810. In response to registering a "hit" by the energy blasters, a visual effect 925 is displayed at the second virtual model 915.

Figure 10:
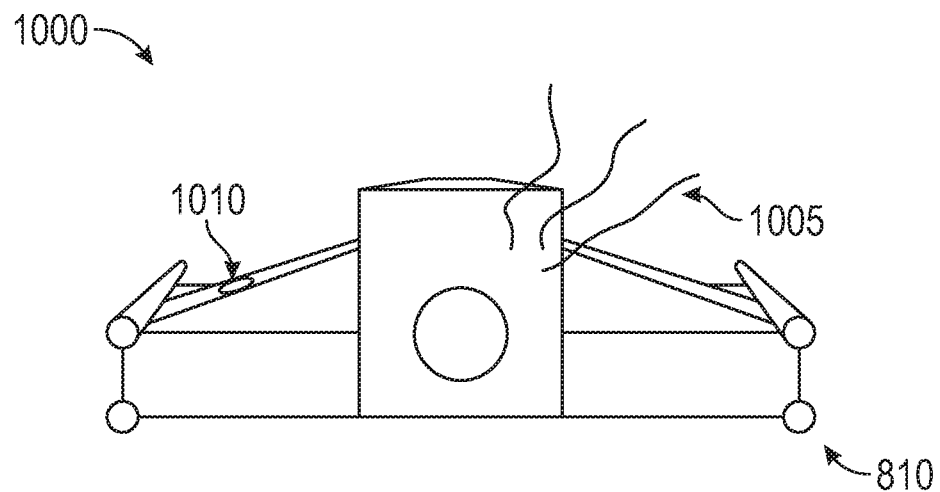
FIG. 10 illustrates an exemplary AR display with virtual damage to the virtual model, according to one or more embodiments.

FIG. 10 illustrates an exemplary AR display with virtual damage to the virtual model, according to one or more embodiments. In diagram 1000, the virtual model 810 has sustained virtual damage, e.g., due to a collision with a virtual object, being "hit" by an energy blast from another virtual model, a malfunction of a component of the virtual model 810 (e.g., simulating a thruster failure), and so forth. The diagram 1000 includes a smoke effect 1005 and surface damage 1010 as non-limiting examples of visual effects indicating virtual damage to the virtual model 810.

Figure 11A:
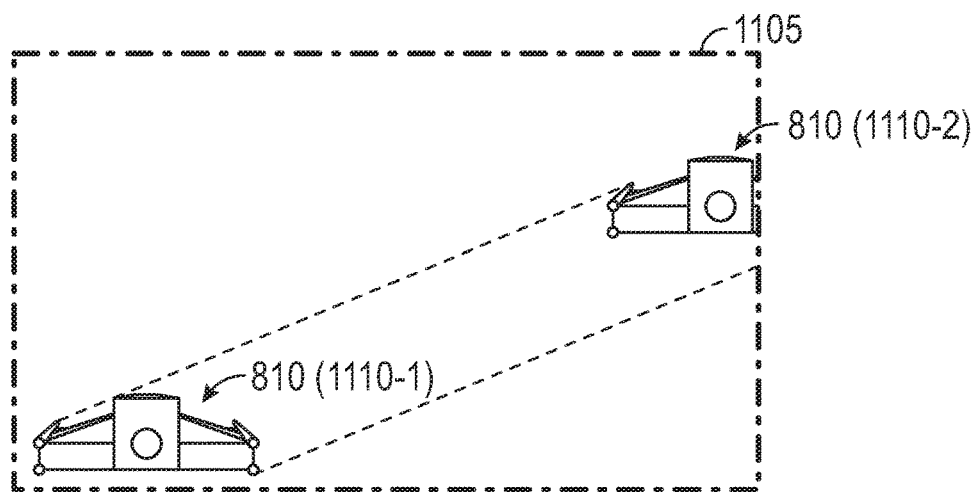
FIGS. 11A-11C illustrates an exemplary sequence of tracking the model and controller device, according to one or more embodiments.
Figure 11B:
Figure 11C:
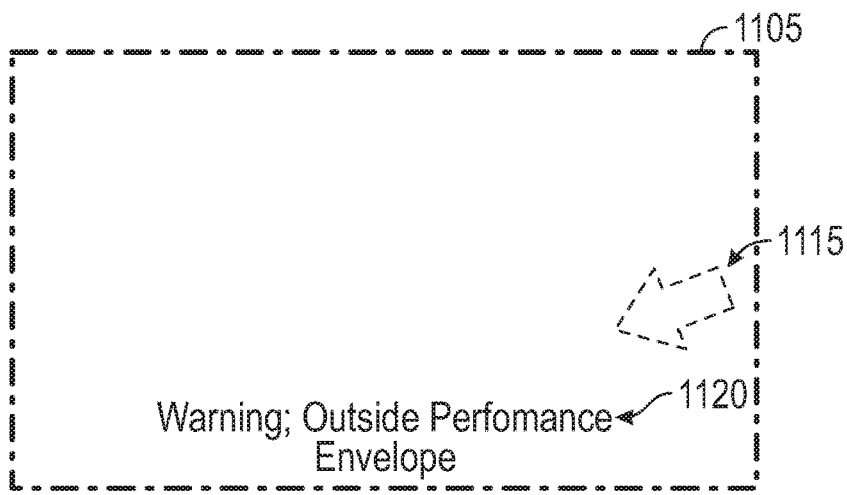

FIGS. 11A-11C illustrates an exemplary sequence of tracking the model and controller device, according to one or more embodiments. The features shown in diagram 1100 may be used in conjunction with other embodiments, such as being generated during execution of the application 150 of FIG. 1.

The diagram 1100 shows an exemplary field of view 1105 of a user, as viewed through an AR-capable headset (e.g., using the display device 700 of FIG. 7). In FIG. 11A, the user manipulates the spacecraft such that the virtual model 810 moves from a first position 1110-1 to a second position 1110-2. In FIG. 11B, the user has continued to manipulate the spacecraft such that the virtual model 810 is no longer displayed on the field of view 1105. In FIG. 11C, the user is prompted (e.g., by the application 150 of FIG. 1) to return the spacecraft into the field of view 1105 or other corresponding space, such that the virtual model 810 will again be displayed in the field of view 1105. Additionally or alternately, the user may be prompted to change his or her orientation (e.g., move his or her head) to change the field of view 1105. The prompt(s) may be provided to the user in any suitable manner. In one non-limiting example, the prompt is visually displayed as a visual prompt 1115 indicating a direction of movement for the spacecraft so that the virtual model 810 will be displayed in the field of view 1105.

In another non-limiting example, the prompt is described in terms of operation of the spacecraft, suggesting that the user undo their previous action to return the virtual model 810 to the field of view 1105. For example, the visual prompt 1120 indicates that the user's manipulation of the spacecraft has caused the virtual model 810 to operate outside its performance envelope. In some cases, the application 150 penalizes the use for failing to timely return the spacecraft, by increasing an amount of virtual damage to the virtual model 810, by reducing the performance of the virtual model 810 (e.g., throttled speeds, temporarily disabling the energy blasters). Beneficially, describing the prompt in terms of operation of the spacecraft provides a more immersive experience for the user.

As discussed above, the application 150 receives the user input provided through the one or more input devices 142, and causes one or more visual effects to be displayed using the display 125. The one or more visual effects are referenced to the virtual model. In some embodiments, the application 150 may provide other prompts to the user. In some embodiments, the application 150 performs a calibration operation that prompts the user to hold the spacecraft with a predefined orientation (e.g., wings level) within the field of view 1105, and to press the button when the spacecraft is in the predefined orientation. For example, during the calibration operation, the application 150 may receive identification information from the spacecraft, identify the one or more external visual indicators of the spacecraft, receive orientation information from the controller device, and/or display the virtual model. In another example, the application 150 prompts the user when the physical model collides or otherwise interacts with virtual objects, such as displaying sparks, blinking a red light, and so forth.

Figure 12:
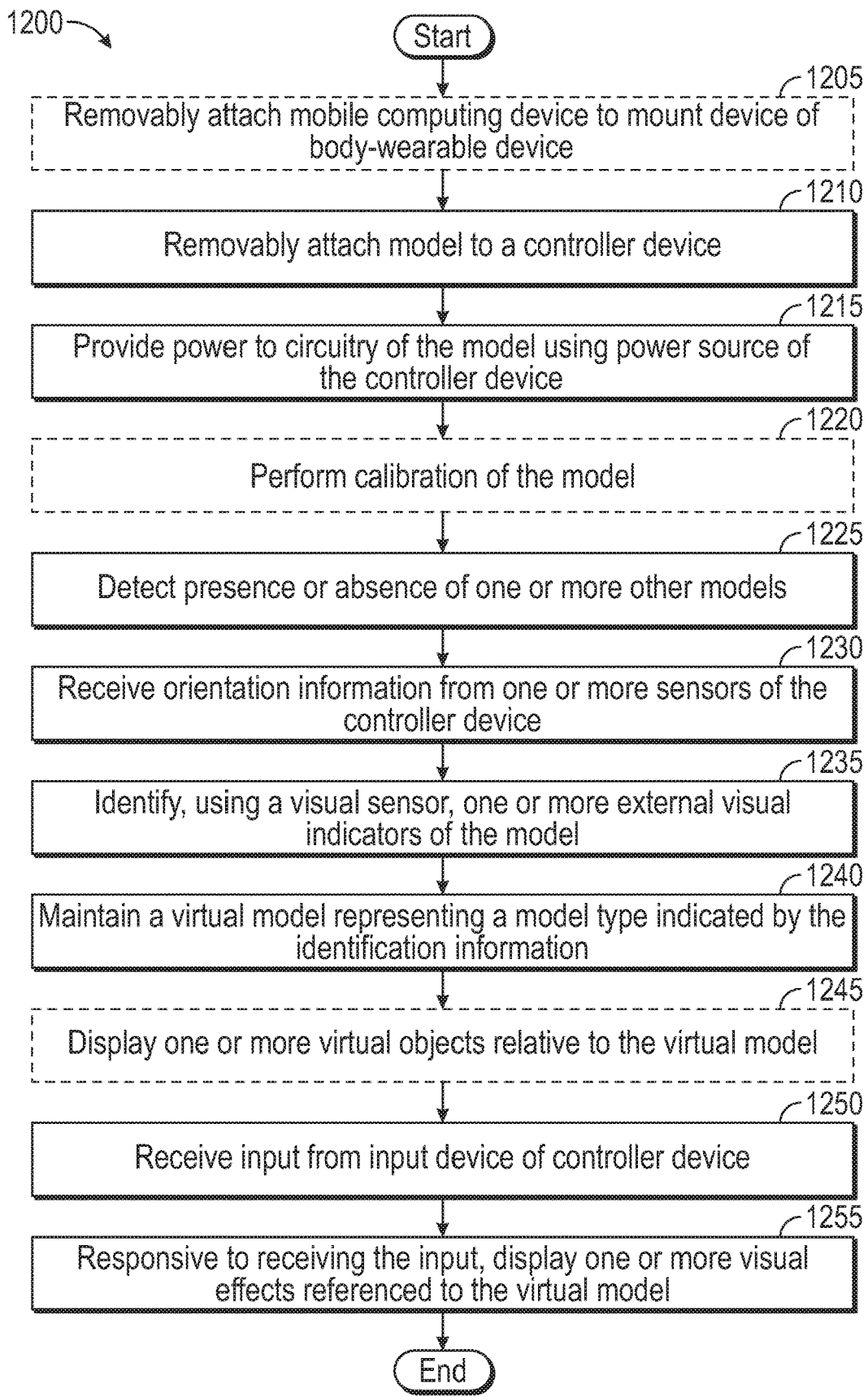
FIG. 12 is a method of displaying visual effects referenced to a virtual model, according to one or more embodiments.

FIG. 12 is a method 1200 of displaying visual effects referenced to a virtual model, according to one or more embodiments. The method 1200 may be performed in conjunction with other embodiments, such as performing several blocks of the method 1200 using the application 150 of FIG. 1.

The method 1200 begins at block 1205, where a mobile computing device is removably attached to a mount device of a body-wearable device. At block 1210, the model is removably attached to a controller device. At block 1215, a power source of the controller device provides power to circuitry of the model. At block 1220, calibration of the model is performed. At block 1225, presence or absence of one or more other models is detected. In some embodiments, a visual appearance of one or more external visual indicators of the model is controlled based on the presence of the one or more other models, e.g., to visually distinguish the model from the one or more other models. At block 1230, orientation information is received from one or more sensors of the controller device. At block 1235, a visual sensor is used to identify the one or more external visual indicators of the model. At block 1240, a virtual model that represents a model type indicated by the identification information is displayed. At block 1245, one or more virtual objects are displayed relative to the virtual model. At block 1250, input is received from an input device of the controller device. At block 1255, and responsive to receiving the input, one or more visual effects referenced to the virtual model are displayed. The method 1200 ends following completion of the block 1255.

In the current disclosure, reference is made to various embodiments. However, it should be understood that the present disclosure is not limited to specific described embodiments. Instead, any combination of the preceding features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method, or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus, or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method comprising:
receiving identification information from circuitry of a model removably attached to a controller device, wherein the model has a physical appearance according to a model type of the model, wherein the model type is included in a set of predefined virtual elements of an augmented reality environment, wherein the controller device is formed to include a handle configured to be gripped by a user's hand, wherein a power source of the controller device provides power to the circuitry;
receiving orientation information from one or more sensors of the controller device;
identifying, using a forward-sensing visual sensor of a body-worn device, one or more external visual indicators of the model, wherein the one or more external visual indicators comprise a first external visual indicator that is visible at an external surface of the model when the handle is gripped;
maintaining, within the augmented reality environment, a virtual model corresponding to the model type indicated by the identification information, wherein a structural configuration of the virtual model corresponds to the physical appearance of the model, wherein an orientation of the virtual model is based on the orientation information and referenced to the one or more external visual indicators;
displaying, using the display, the virtual model at a location referenced to a location of the model within a field of view of the user, wherein displaying the virtual model comprises selecting a magnification to cause the virtual model to appear larger than the model within the field of view; and
responsive to receiving an input, displaying one or more visual effects using a display of the body-worn device, wherein the one or more visual effects are referenced to the virtual model.

2. The method of claim 1,
wherein the input is received from an input device of the controller device.

3. The method of claim 1, wherein the one or more external visual indicators of the model comprise one or more active visual indicators that are coupled with the circuitry and are powered using the power source.

4. The method of claim 3, wherein the one or more active visual indicators comprise one or more light emitting diodes (LEDs), the method further comprising:
selecting, based on detecting a presence of one or more other models, a color to be displayed by the one or more LEDs.

5. The method of claim 1, further comprising:
displaying one or more virtual objects relative to the virtual model,
wherein the one or more visual effects comprises a first visual effect that includes the virtual model and a first virtual object of the one or more virtual objects.

6. The method of claim 5, wherein the one or more virtual objects comprises a second virtual model corresponding to a second model removably attached to a second controller device.

7. The method of claim 5, wherein the one or more visual effects comprises a second visual effect indicating virtual damage to the virtual model responsive to the first visual effect.

8. The method of claim 1, wherein the display is included in a mobile computing device that is removably attached to a mount device of the body-worn device.

9. A system comprising:
a model comprising circuitry and one or more external visual indicators, wherein the model has a physical appearance according to a model type of the model, wherein the model type is included in a set of predefined virtual elements of an augmented reality environment;
a controller device comprising:
a handle configured to be gripped by a user's hand;
an interface dimensioned to removably attach to the model;
a power supply configured to provide power to the circuitry when the controller device is removably attached to the model; and
one or more sensors;
a body-wearable device comprising:
a forward-sensing visual sensor; and
a display; and
one or more computer processors configured to:
identify, using the visual sensor, at least a first external visual indicator of the one or more external visual indicators that is visible at an external surface of the model when the handle is gripped;
maintain, within the augmented reality environment, a virtual model corresponding to the model type indicated by identification information received from the circuitry, wherein a structural configuration of the virtual model corresponds to the physical appearance of the model, wherein an orientation of the virtual model is based on orientation information received from the one or more sensors and referenced to the one or more external visual indicators;
display, using the display, the virtual model at a location referenced to a location of the model within a field of view of the user, wherein displaying the virtual model comprises selecting a magnification to cause the virtual model to appear larger than the model within the field of view; and
responsive to receiving an input, displaying one or more visual effects using the display, wherein the one or more visual effects are referenced to the virtual model.

10. The system of claim 9, wherein the display is included in a mobile computing device that is removably attached to a mount device of the body-wearable device.

11. The system of claim 10, wherein the one or more computer processors are included in the mobile computing device.

12. The system of claim 9, wherein the one or more sensors comprises at least one of an accelerometer, a gyroscope, and a magnetometer.

13. The system of claim 9,
wherein the input is received from an input device of the controller device.

14. A controller device comprising:
a body contoured as a handle to be gripped by a user's hand;
an attachment interface dimensioned to removably attach the body to a selected model of a plurality of models, each model of the plurality of models having a physical appearance according to a respective model type of a plurality of model types, wherein the plurality of model types are included in a set of predefined virtual elements of an augmented reality environment, each model comprising circuitry and at least a first external visual indicator that is visible at an external surface of the model when the model is attached to the attachment interface and the handle is gripped;

a power supply configured to provide power to the circuitry of a first model of the plurality of models when the first model is removably attached to the attachment interface;

one or more sensors;

a communication interface configured to:

transmit identification information identifying the model type of the first model to an external computing device;

transmit sensor information from the one or more sensors to the external computing device, wherein the sensor information configures an application executing on the external computing device to display a virtual model within the augmented reality environment with a selected magnification to cause the virtual model to appear larger than the model within a field of view of the user, wherein a structural configuration of the virtual model corresponds to the physical appearance of the first model as indicated by the identification information, and wherein a location of displaying the model is referenced to a location of the first model within the field of view; and receive information from the application that corresponds to one or more actions of the virtual model within the augmented reality environment; and a sensory feedback device configured to provide sensory feedback with timing based on the one or more actions of the virtual model.

15. The controller device of claim 14, wherein the sensory feedback device comprises a force feedback motor.

16. The controller device of claim 14, wherein the sensor information comprises orientation information describing an orientation of the controller device.

17. The controller device of claim 14, further comprising:
an input device disposed at a surface of the body,
wherein the communication interface is further configured to transmit input information received at the input device to the external computing device.

18. The system of claim 13, wherein the input device comprises:
a button extending from a side surface of the controller device.

19. The method of claim 1,
wherein the location of the virtual model is offset from the location of the model.

20. The method of claim 1,
wherein the location of the virtual model is overlaid with the location of the model.

* * * * *